United States Patent [19]
Malott

[11] Patent Number: 5,657,604
[45] Date of Patent: Aug. 19, 1997

[54] PANEL CONNECTOR

[75] Inventor: John S. Malott, Cincinnati, Ohio

[73] Assignee: Downing Displays, Inc., Milford, Ohio

[21] Appl. No.: 579,295

[22] Filed: Nov. 27, 1995

[51] Int. Cl.⁶ ............................................. F16B 7/04
[52] U.S. Cl. .................. 52/655.1; 52/656.9; 52/653.2;
 52/731.5; 52/732.2; 52/736.2; 52/775; 403/252;
 403/255; 403/297
[58] Field of Search .................... 52/656.9, 646,
 52/653.2, 655.1, 761, 781, 731.5, 732.1,
 732.2, 736.2, 766, 767, 768, 769, 775;
 403/297, 292, 170, 231, 362, 252, 254,
 255, 256, 257, 240, 264, 291

[56] References Cited

U.S. PATENT DOCUMENTS

| | | |
|---|---|---|
| D. 275,324 | 8/1984 | Wahlin . |
| D. 361,034 | 8/1995 | Strässle . |
| 3,338,602 | 8/1967 | Arnd . |
| 3,371,454 | 3/1968 | Anderson . |
| 3,469,335 | 9/1969 | Leigh . |
| 3,574,367 | 4/1971 | Jankowski . |
| 3,672,710 | 6/1972 | Kroopp . |
| 3,701,553 | 10/1972 | Vogt . |
| 3,945,742 | 3/1976 | Condevaux . |
| 4,017,199 | 4/1977 | Strassle . |
| 4,142,343 | 3/1979 | Trafton . |
| 4,345,849 | 8/1982 | Stenemann . |
| 4,360,286 | 11/1982 | Beer . |
| 4,455,103 | 6/1984 | Hackenberg . |
| 4,490,064 | 12/1984 | Ducharme . |
| 4,556,337 | 12/1985 | Marshall ................ 403/255 |
| 4,583,359 | 4/1986 | Staeger . |
| 4,607,991 | 8/1986 | Porter .................. 403/252 X |
| 4,609,302 | 9/1986 | Kittell .................. 403/291 X |
| 4,641,983 | 2/1987 | Strässle . |
| 4,848,952 | 7/1989 | Strässle . |
| 4,893,959 | 1/1990 | Offenbroich . |
| 4,907,388 | 3/1990 | Siahatgar ............... 403/252 X |
| 4,951,440 | 8/1990 | Staeger . |
| 4,995,211 | 2/1991 | Malott . |
| 5,101,607 | 4/1992 | Staeger . |
| 5,184,920 | 2/1993 | Strässle . |
| 5,209,598 | 5/1993 | Züllig . |
| 5,251,994 | 10/1993 | Strässle . |

FOREIGN PATENT DOCUMENTS

| | | | |
|---|---|---|---|
| 2129259 | 10/1972 | France ................. 403/297 |
| 2508120 | 12/1982 | France ................. 403/297 |
| 2687194 | 8/1993 | France ................. 403/119 |
| 2108342 | 9/1972 | Germany ............... 403/297 |
| 4002125 | 8/1991 | Germany ............... 403/292 |
| 8901425 | 1/1991 | Netherlands ............ 403/252 |
| 442870 | 1/1968 | Switzerland ............ 403/252 |

OTHER PUBLICATIONS

Modul Einrichtungssysteme GmbH/Düsseldorf, Zargenstück, p. 13.

Foga Systems, Distributor and Dealer Price List (Jul. 15, 1990), The Foga System, p. 2.

P. 27 of brochure featuring Octanorm USA, Inc. and SYMA–Systems, Inc.

Photograph of prior art Agam panel connector (shown in the open state).

*Primary Examiner*—Carl D. Friedman
*Assistant Examiner*—Laura A. Saladino
*Attorney, Agent, or Firm*—Wood, Herron & Evans, L.L.P.

[57] ABSTRACT

A panel connector (10) is comprised of substantially identical locking bars (12A, 12B) held together in clothes-pin fashion by a resilient rod (14). The body (46) of the connector is received in a channel (86) of one structural member (80A). Jaws (34) formed on the top (18) of each bar (12A, 12B) may be received in a slot (92) of a second structural member (80B) and the jaws thereafter urged apart by a spreader member (70) to grippingly engage the slot (92) and lock the structural members (80A, 80B) together. Camming surfaces (42) of the jaw sections (34) facilitate use of connector (10) over a wide range of wall thicknesses at the slot (92).

17 Claims, 1 Drawing Sheet

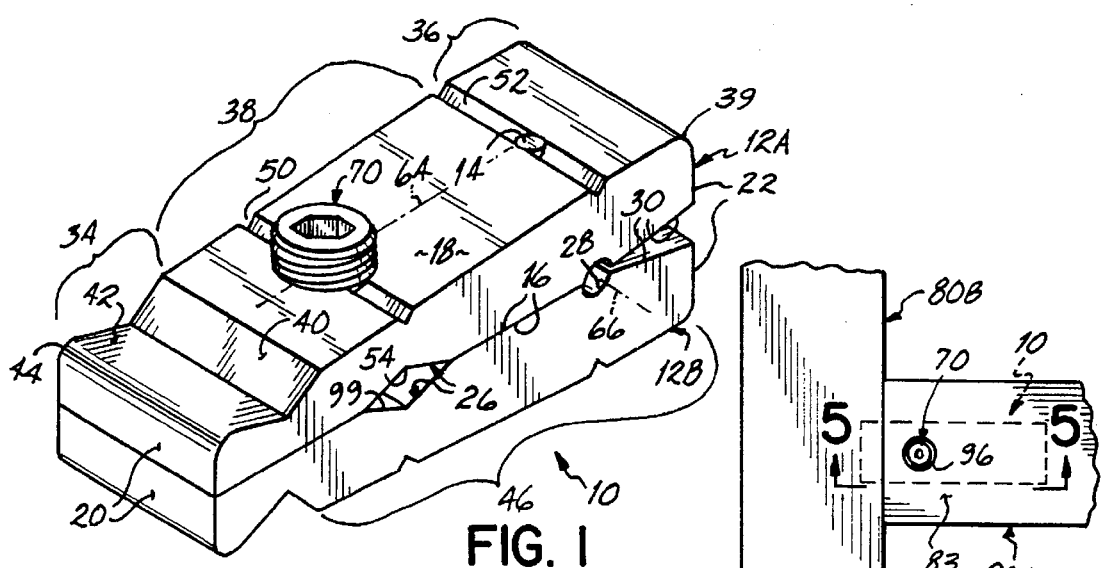
FIG. 1
FIG. 4
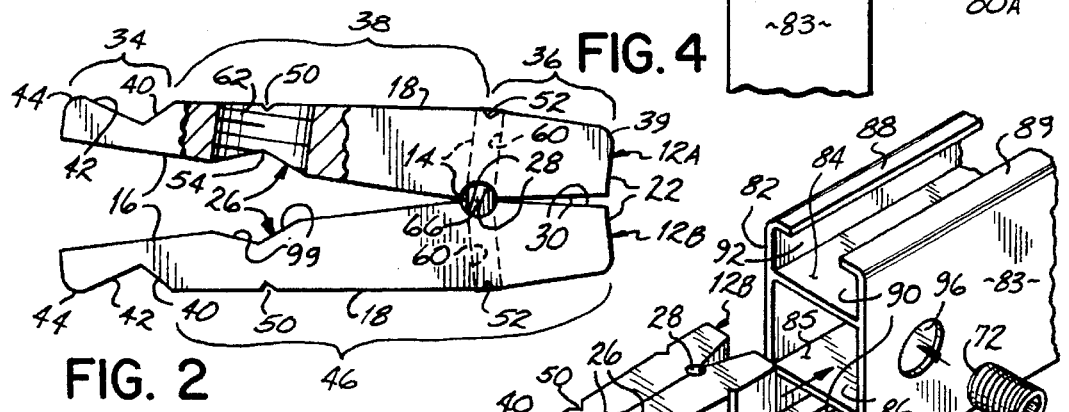
FIG. 2
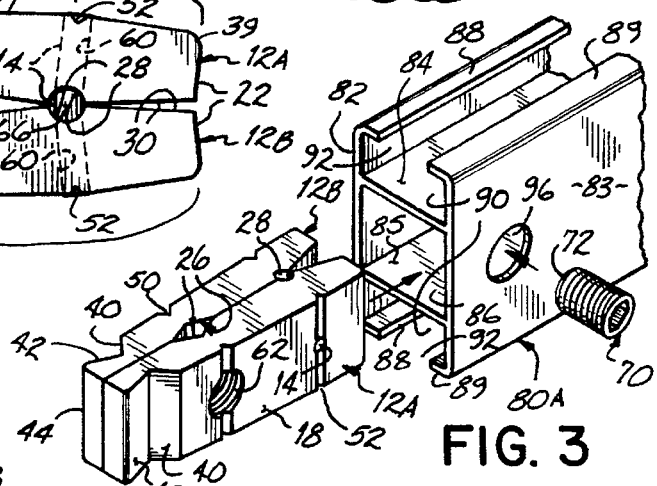
FIG. 3
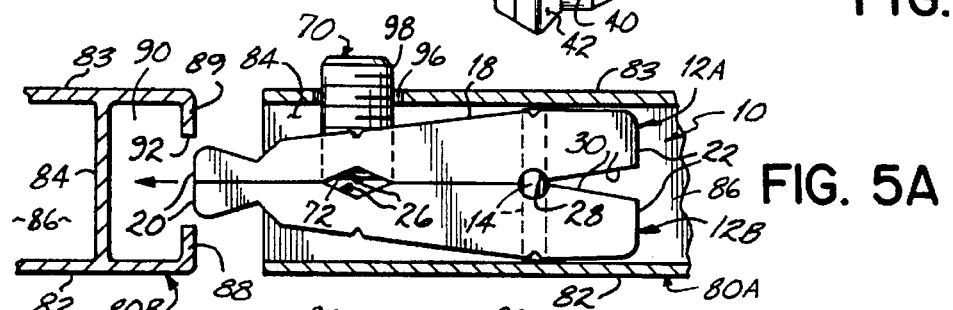
FIG. 5A
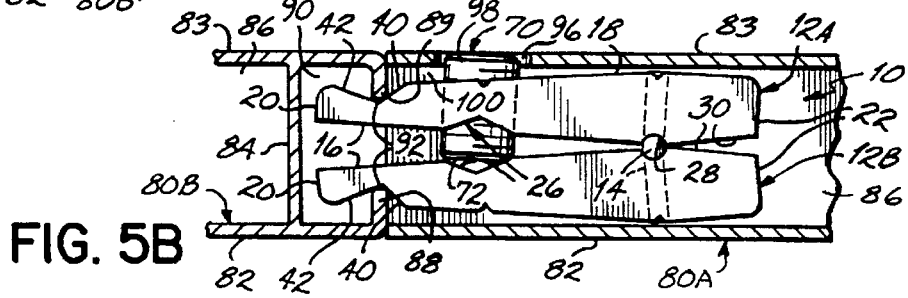
FIG. 5B 5,657,604

PANEL CONNECTOR

BACKGROUND OF THE INVENTION

I. Field of the Invention

The present invention relates to panel connectors to hold together structural members of hardwall panel display systems and the like.

II. Description of Prior Art

Hardwall panel display systems are widely used in today's commercial environments. Such devices typically include extruded aluminum structural member which, when laid at right angles to one another, form a structural frame to support a display panel or the like. To hold the member together as a frame, panel connectors are used. In a typical hardwall panel display, each structural member has a generally rectangular central channel extending lengthwise through the member and a pair of longitudinally extending slotted channels to either side of the central channel. The slotted channels have a generally T-shape cross-section accessible through longitudinally extending slots.

To attach the structural members together, the panel connector is inserted inside the central channel of one structural member with a portion of the connector extending through the slot of the adjacent structural member and into the slotted channel. Actuation of the connector, such as by rotation of a screw, activates the extended portion of the panel connector against the slot walls to lock the two components together. Typical of the panel connectors currently in use, is that they are comprised of multiple different components which can be expensive to manufacture and, in some cases, may fall apart if not handled properly.

By way of example, one panel connector is comprised of a pair of locking bars each with a distal outturned tooth. The proximal ends of the bars are formed in complimentary fashion such that the proximal end of one bar is a flange which rotates within a proximal channel provided in the other bar as the teeth engage a slot of the structural member. The use of such substantially dissimilar locking bars would require a different die for each locking bar with consequent manufacturing costs. Also, the teeth on that panel connector work over a limited range of structural member wall thickness, and the bars can be separated from one another under certain circumstances.

SUMMARY OF THE INVENTION

The present invention provides a panel connector which uses a minimum number of components and in which the major elements are substantially identical so that they may be formed from a common extrusion or die, thus minimizing the cost of manufacturing the panel connector. To this end, and in accordance with one aspect of the present invention, the panel connector is comprised of a pair of substantially identical locking bars each having a slot engaging jaw. The bars are held together in a clothes-pin formation such that the jaws may be easily spread apart to lock to the slot walls. To facilitate the locking action, a spreader member such as a screw may extend through one of the bars into operative relationship bearing against the other bar. To keep the bars together as an assembled clothes-pin unit, a resilient rod or wire may be tightly fitted through aligned apertures extending through the two bars spaced rearwardly of the jaws and, preferably, rearward of the spreader member as well.

In a preferred embodiment, the jaws are formed by providing a camming surface adjacent the front end of each bar. As the screw urges the jaws apart, the camming surfaces engage the slot walls to thereby grip firmly within the slotted channels and over a wide range of slot wall thickness.

By virtue of the foregoing, a panel connector is provided in which the slot engaging jaws are provided by substantially identical components such as may be made with the same die to thereby reduce manufacturing costs. Further, the two substantially identical components are assembled into a clothes-pin arrangement which is simple to use and not prone to failing apart in normal handling. These and other objects and advantages of the present invention shall be made apparent from the accompanying drawings and description thereof.

BRIEF DESCRIPTION OF THE DRAWINGS

The accompanying drawings, which are incorporated in and constitute a part of this specification, illustrate an embodiment of the invention and, together with the general description of the invention given above and the detailed description given below, serve to explain the principles of the invention.

FIG. 1 is a perspective view of a panel connector in accordance with the principles of the present invention and showing the connector in the closed position;

FIG. 2 is a side view, partially broken away, of the panel connector of FIG. 1 showing the connector in the open position but with the spreader member removed for the sake of clarity;

FIG. 3 is an exploded perspective view of a structural member and the panel connector of FIG. 1 for explaining use thereof;

FIG. 4 is a side view of a pair of the structural members of FIG. 3 shown locked together by the panel connector of FIG. 1; and FIGS. 5A and 5B are views taken along line 5—5 of FIG. 4 for purposes of describing an advantageous use of the panel connector of FIG. 1.

DETAILED DESCRIPTION OF THE DRAWINGS

With reference to FIGS. 1 and 2, a panel connector 10 incorporating the principles of the present invention includes a pair of substantially identical locking bars 12A and 12B held together in clothes-pin fashion by resilient rod member 14 extending through the bars. Each locking bar 12A or 12B is an extruded aluminum component having a generally planar bottom 16 and an oppositely disposed top side 18 extending between generally parallel front and back edges 20 and 22 of the bar. A V-shaped notch 26 and a semicircular-shaped notch 28 are formed in bottom 16 extending transversely thereacross parallel to and inboard of front and back edges 20 and 22, respectfully. Bottom 16 further includes a chamfered section 30 between notch 28 and back edge 22 to facilitate the clothes-pin action of connector 10 as will be described.

Top 18 of each bar 12A, 12B includes an outturned jaw section 34 interconnected to top wall 36 by slope wall 38. Top wall 36 extends from radiused corner 39 of back edge 22 in a plane generally parallel to the plane defined by bottom 16 and overlying chamfered section 30 thereof. Slope wall 38 extends from top wall 36 to stop wall 40 defining the back end of jaw section 34. Jaw section 34 is completed by camming surface 42 extending from radiused corner 44 at front edge 20 and downwardly to the stop wall 40. Panel connector 10 may thus be seen as having a front end including jaw section 34 and a body section or back end 46 including the potion of bars 12A, 12B between stop wall 40 and back edge 22. A pair of narrow V-shaped grooves 50, 52 are formed in top 18 inboard of front and rear edges 20, 22. Groove 50 extends transversely across slope wall 38 to coincide with crest 54 of notch 26 in bottom 16. Similarly, notch 52 extends transversely across top 18 coincident with notch 28 in bottom 16 and to define the junction with slope wall 38 and top wall 36. Notches 50 and 52 are provided to facilitate positioning of one or more tools (not shown) to drill apertures 60 in locking bars 12A and 12B and through bore 62 in bar 12A for purposes now to be described.

To form panel connector 10, each locking bar 12A, 12B is provided with an aperture 60 extending between top 18 and bottom 16 transverse to the longitudinal axis or center line 64 of the bar and intersecting notch 28 and groove 52. Also, one of the bars 12A or 12B may be provided with a through bore 62, preferably threaded, extending between top 18 and bottom 16 transverse to center line 64 and intersecting notch 26 and groove 50. Locking bars 12A and 12B are tipped one with respect to the other such that their bottoms 16 are in confronting relationship and their respective apertures 60 are aligned. A resilient rod member 14 is press fitted through both apertures 60 so as to resiliently urge the bars together in the closed position as shown in FIG. 1 with jaw sections 34 as close together as possible. Member 14 may be a 3/32 diameter nylon rod or a length of spring wire. As jaws 34 are urged apart, as will be described, chamfered sections 30 are provided to allow the back edges 22 of each bar to come closer together as they pivot about an axis 66 through rod 14 in the area of notches 28 to thus open and close like a clothes-pin. Notches 28 provide a cut out or relief area so as to allow rod-like member 14 to bend or flex in that area without crimping or kinking as exemplified in FIG. 2.

Bars 12A and 12B may be operatively spread apart into the open position of FIG. 2 by actuation of a spreader member 70 such as a threaded set screw, engaged through bore 62 with the tip end 72 of screw 70 operatively engaging notch 26 of locking bar 12B to bear thereagainst. As screw 70 is continued into locking bar 12A, jaws 34 are caused to spread apart into the open position as shown in FIG. 2 and with chamfered sections 30 brought close together. Backing out screw 70 allows the biasing action of member 14 to cause jaws 34 to come back together into the closed position as sections 30 pivot away from each other.

Locking bars 12A and 12B are substantially identical and, particularly, have identical peripheries and profiles. Consequently, they may be made by a common die and apertures 60 and through bore 62 (where needed) formed in locking bars 12A and 12B after they are extruded from the die. Bars 12A and 12B are sized such that when combined as connector 10, they fit together within the appropriate channels of a pair of structural member channels to hold them together as will now be described with reference to FIGS. 3–5. To this end, a first or horizontal structural member 80A is to be locked to a second or vertical structural member 80B which may be identical to member 80A. Each member 80A, 80B has a pair of generally parallel outer walls 82, 83 and a pair of generally parallel inner walls 84, 85 extending transversely between walls 82, 83 to define a generally rectangular central channel 86 extending longitudinally the entire length of the structural member. Walls 82, 83 continue beyond transverse walls 84, 85 and terminate in inwardly directed flanges 88, 89 to define a slotted channel 90 therein also extending longitudinally along the length of each structure member. Each channel 90 is accessible via a slot 92 defined between each pair of flanges 88, 89. First structural member 80A is at a right angle to member 80B such that the central channel 86 of member 80A is aimed at slot 92 of the second structural member 80B with the walls 82 and 83 of both members extending in respective common planes.

Bars 12A, 12B of panel connector 10 are dimensioned such that when they are assembled in the closed position as shown in FIG. 1, panel connector 10 may be slid back edge 22 first, into central channel 86 of structural member 80A (see FIG. 3) with jaws 34 of panel connector 10 extending outwardly. Preferably, a through bore 96 is provided in one of walls 82 or 83 of structural member 80A to align with through bore 62 of panel connector 10 so that set screw 70 may be inserted into bore 62 and manipulated, such as with an Allen wrench (not shown), exteriorly of member 80A. Also, when screw 70 is initially inserted into bore 96 and partially threaded into bore 62 of panel connector 10, an upper segment 98 of screw 70 extends through bore 96 beyond wall 83 to thus hold panel connector 10 within central channel 86. Slotted channel 90 of structural member 80B receives the extended, but closed, jaws 34 through slot 92 (see FIG. 5A).

After jaw sections 34 are received in channel 90, further actuation of the spreader member such as by tightening screw 70 causes the tip 72 thereof to bear against bar 12B at notch 26 to thereby urge jaws 34 apart and into engagement with slot 92 as seen in FIG. 5B. This action locks members 80A and 80B together. Also, upper segment 98 of screw 70 passes into bore 96 below the outer surface of wall 83, but not completely out of bore 96 so as to retain connector 10 within channel 86. As also seen in the figures, camming surfaces 42 of jaws 34 are generally planar as opposed to being notched or stepped to define teeth. Consequently, as jaws 34 are spread apart, a camming action occurs against the edges of slot flanges 88, 89 and along surfaces 42 (with screw 70 holding connector 10 in member 80A) to cause member 80B to move into and against member 80A to thereby securely lock members 80A and 80B together. The camming action thus results in a strong and tight lock over a range of thicknesses of the flanges.

When it is desired to disassemble the members, screw 70 is merely accessed and loosened via bore 96. As screw 70 is retracted, rod 14 urges bars 12A and 12B, and thus jaws 34, together until closed so that they may be withdrawn from slotted channel 90 of structural member 80B via slot 92 thereof. Also, the upper segment 98 of screw 70 will protrude beyond wall 83 to thus continue to hold panel connector 10 within component 80A as desired.

In one embodiment, each bar 12A, 12B has a length measured between front and back edge 20 and 22 of approximately 1 7/8 inch, a width measured along notch 26, for example, of approximately 5/8 inch, and a thickness measured between top wall 36 and the plane of bottom 16 of approximately 5/16 inch. Notch 50 may be inboard of front edge 20 and groove 26 (as measured from the crest 54 thereof) about 0.7 inches, with groove 52 and notch 28 further inboard therefrom approximately an additional 0.75 inches. Grooves 50, 52 may be 0.03 by 0.03 inches, notch 26 may recede into bottom 16 about 0.06 inches, with notch 28 having a radius of about 0.06 inches and chamfered section 30 meeting back edge 22 about 0.06 inch from the plane of bottom 16. Aperture 60 is sized to receive a 3/32 nylon rod in press-fitting engagement, bore 62 may be sized to receive a 1/8 inch diameter by 1/2 inch set screw 70. Preferably, the side walls 99 of each notch 26 diverge along equal angles from crest 54 with the forward side wall 99 of each locking bar 12A or 12B being in a plane defined by the camming surface 42 of the other locking bar 12B or 12A when connector 10 is in the closed position. To this end, camming surface 42 extends inboard of front edge 20 about 0.275 inches with stop wall 40 extending longitudinally about 0.1 inch to slope wall 38 such that front edge 20 is about 0.175 inch tall with the junction of surface 42 and wall 40 being about one-tenth inch above bottom 16.

In use, two substantially identical bars 12A and 12B are made and assembled together into a clothes-pin configuration with rod 14 engaged within apertures 60 and urging bars 12A and 12B closed. One of bars 12 (e.g., bar 12A) is provided with bore 62. Without set screw 70 in bore 62, connector 10 is slid rearwardly into central channel 86 of one structural member 80A. Thereafter, set screw 70 is passed through bore 96 of member 80A and into bore 62 of locking bar 12A, but not so far as to cause bars 12A and 12B to separate or open. A second structural member 80B is then mated up against the first member 80A such that jaws 34 pass through slot 92 and into channel 90 of member 80B. Set screw 70 is then threaded down against opposite locking bar 12B to thereupon spread jaws 34 apart in clothes-pin like fashion and causing camming surfaces 42 to engage slot flanges 88, 89 and pull members 80A and 80B together into locked relationship. Slope wall 38 provides room (as at 100) for the bars to spread apart without impacting against the interior of central channel 86 of member 80A. After use, screw 70 may be backed all the way out to release jaws 34 from slotted channel 90 so that the structural member 80A and 80B units may be disassembled.

By virtue of the foregoing, a low cost, easy and reliable to use panel connector is provided.

While the present invention has been illustrated by description of a preferred embodiment, and while the illustrative embodiment has been described in considerable detail, it is not the intention of Applicant to restrict or in any way limit the scope of the appended claims to such detail. Additional advantages and modifications will readily appear to those skilled in the art. For example, the locking bars are preferably extruded of grade 6063 aluminum have a hardness of T5. Alternatively, the bars may be formed in other ways or by other materials which may even have cavities or hollows in them, provided, however, that with the exception of tolerance variations, draft, and the like from piece to piece, the bars are otherwise substantially identical (save for bore 62 in one of them). As an alternative to bore 62, the spreader member could be placed into operative engagement near the back edge 22 of one or both bars 12A and 12B to cause the back ends to close together (like a clothes-pin) thus separating the jaws into engagement with the structural member 80B. The invention in its broader aspects is therefore not limited to the specific details, representative apparatus and method, and illustrative example shown and described. Accordingly, departures may be made from such details without departing from the spirit or scope of Applicant's general inventive concept.

What is claimed is:

1. A panel connector for connecting together two structural members one of which has a first channel and another of which has a slotted channel accessible via a slot, the connector comprising:

a first locking bar having a generally planar bottom and an oppositely disposed top, both extending between front and back edges of the first locking bar, the top having a jaw section formed adjacent the front edge, the bar further having an aperture extending between the top and bottom inboard of the back edge;

a second locking bar being substantially identical to the first locking bar with the further provision of a bore extending between the top and bottom inboard of the front edge;

a resilient rod extending through the apertures of both locking bars with the bottom of both locking bars in confronting relationship to resiliently urge the jaw sections together, the bars being adapted to collectively fit within said first channel of said one structural member; and a threaded member extending through the bore of the second locking bar aimed at the bottom of the first locking bar, the bars being adapted to collectively fit their two jaw sections together through said slot into said slotted channel of said another structural member to thereafter be urged apart and grippingly engage said slot as the threaded member bears against the first locking bar whereby to lock said two structural members together.

2. The panel connector of claim 1, each of the locking bars further having a chamfered section adjacent the back edge whereby to facilitate urging apart the jaw sections by the threaded member.

3. The panel connector of claim 2, the apertures holding the resilient rod being inboard of the chamfered section.

4. The panel connector of claim 1, the bottom of each locking bar further having a notch formed inboard of the front edge and aligned with the threaded bore of the second locking bar such that the threaded member seats into the notch of the first locking bar as it projects through the bore of the second locking bar.

5. The panel connector of claim 1, the bottom of each locking bar further having a notch formed inboard of the back edge and aligned with the aperture, the notches of the bars cooperating to facilitate action of the resilient rod.

6. The panel connector of claim 1 wherein the jaw section of each of the locking bars includes a camming surface.

7. The panel connector of claim 1 wherein the resilient rod is comprised of nylon.

8. The panel connector of claim 1 wherein the resilient rod is a length of springwire.

9. A panel connector for connecting together two structural members one of which has a first channel and another of which has a slotted channel accessible via a slot, the connector comprising:

a pair of substantially identical locking bars, each having a top and a bottom interconnecting a back end and a front end, and further having a jaw defined in the top at the front end, the bottoms of the locking bars being in confronting relationship;

a resilient rod member fitted within a pair of aligned apertures extending through respective areas of the locking bars holding the pair of locking bars together in a clothes-pin configuration with their front ends being urged together to define a closed position of the panel connector; and a spreader member operatively engaging at least one of the locking bars such that actuation of the spreader member urges the front ends of the locking bars apart to define an open position of the panel connector, the bars being adaptable to collectively fit (i) the back ends thereof within said first channel of said one structural member and (ii) the jaws thereof, in the closed position of the panel connector, through said slot into said slotted channel of said another structural member such that when the panel connector is thereafter in the open position, the jaws are adapted to be urged into gripping engagement with said slot whereby to lock said two structural members together.

10. The panel connector of claim 9 wherein the spreader member has threads which threadably engage a bore through one of the locking bars to engage against the other locking bar.

11. The panel connector of claim 9 wherein the locking bars have a pair of cooperating relief notches intersecting said apertures whereby to facilitate action of the resilient rod member fitted within the aligned apertures.

12. The panel connector of claim 8 wherein the jaw of each of the locking bars includes a camming surface.

13. The panel connector of claim 9 wherein the resilient rod is comprised of nylon.

14. The panel connector of claim 9 wherein the resilient rod is a length of springwire.

15. A method of connecting together two structural members a first of which has a first channel and a second of which has a slotted channel accessible via a slot, the method comprising:

providing a pair of substantially identical locking bars, each having a top and a bottom interconnecting a back end and a front end, and further having a jaw defined in the top at the front end;

resiliently holding the pair of locking bars together with a resilient rod passing through both of the locking bars in a clothes-pin configuration with the bottoms of the locking bars in confronting relationship and their front ends being urged together into a closed position;

inserting the back ends of the locking bars into the first channel of the first structural member with the jaws thereof extending out from the first channel;

in the closed position, inserting the jaws through the slot and into the slotted channel of the second structural member; and spreading the front ends of the locking bars apart into an open position and causing the jaws to grippingly engage the slot whereby to lock the two structural members together.

16. The method of claim 15 wherein the jaw of each of the locking bars includes a camming surface, the method further comprising camming the slot along the camming surface as the jaws are spread apart whereby to pull the first and second structural members together.

17. The method of claim 15 further comprising providing a relief notch in the bars, with the resilient rod passing through the relief notch.

* * * * *

UNITED STATES PATENT AND TRADEMARK OFFICE
CERTIFICATE OF CORRECTION

PATENT NO. : 5,657,604
DATED : August 19, 1997
INVENTOR(S) : John S. Malott

It is certified that error appears in the above-indentified patent and that said Letters Patent is hereby corrected as shown below:

Col. 2, line 67, "potion" should be -- portion -- .

Col. 3, line 19, "tipped" should be -- flipped -- .

Col. 7, line 5, "8" should be -- 9 -- .

Signed and Sealed this

Twenty-third Day of December, 1997

Attest:

BRUCE LEHMAN

Attesting Officer  Commissioner of Patents and Trademarks